United States Patent [19]

Huret

[11] Patent Number: 4,624,151

[45] Date of Patent: Nov. 25, 1986

[54] DEVICE FOR FIXING AN ACCESSORY ON A CYCLE

[75] Inventor: Gérard Huret, Nanterre, France

[73] Assignee: Huret et ses Fils, Nanterre, France

[21] Appl. No.: 624,711

[22] Filed: Jun. 26, 1984

[30] Foreign Application Priority Data

Jul. 1, 1983 [FR] France ................................ 83 11018

[51] Int. Cl.[4] .......................... G05G 1/04; G05G 7/00
[52] U.S. Cl. ........................................ 74/491; 74/489;
74/501 R; 188/24.12; 188/24.22; 248/231.3;
280/289 R; 403/49; 403/246; 403/398; 474/82
[58] Field of Search ...................... 74/489, 491, 501 R,
74/501 B; 24/115 M, 136 R; 248/65, 231.3, 412,
539; 280/289 R; 403/49, 246, 398; 474/81, 82;
188/24.12, 2 D, 24.21, 24.22

[56] References Cited

U.S. PATENT DOCUMENTS

| | | |
|---|---|---|
| 584,738 | 6/1897 | Hoshall .............................. 403/398 |
| 676,984 | 6/1901 | Hofbauer ........................ 403/409 X |
| 1,094,413 | 4/1914 | Bagley .......................... 280/289 R |
| 1,099,764 | 6/1914 | Polansky ........................ 403/409 X |
| 1,345,209 | 6/1920 | Martin ................................. 403/386 |
| 3,426,614 | 2/1969 | Brilando et al. ............ 280/289 R X |
| 3,870,259 | 3/1975 | Reynolds ............................. 248/539 |
| 4,157,075 | 6/1979 | Kirvutza ..................... 280/289 R X |
| 4,434,679 | 3/1984 | Shimano ............................... 74/491 |

FOREIGN PATENT DOCUMENTS

| | | |
|---|---|---|
| 936795 | 12/1955 | Fed. Rep. of Germany . |
| 403980 | 10/1909 | France . |
| 1284252 | 1/1962 | France . |
| 427539 | 6/1967 | Switzerland . |

Primary Examiner—Allan D. Herrmann
Attorney, Agent, or Firm—Trexler, Bushnell & Wolters, Ltd.

[57] ABSTRACT

A cycle accessory, for example a double lever 2, 3 for controlling a derailleur, is carried by a support 4 defining a fixing tab 11 received and wedged in a cavity of complementary shape which may be defined by a part 1 of the frame and a bridge member 14 brazed on the frame. The arrangement is such that, when a force is exerted on the accessory in the course of use, this force tends to increase the wedging between the fixing tab 11 and the cavity. Applicable to any accessory for a cycle.

10 Claims, 11 Drawing Figures

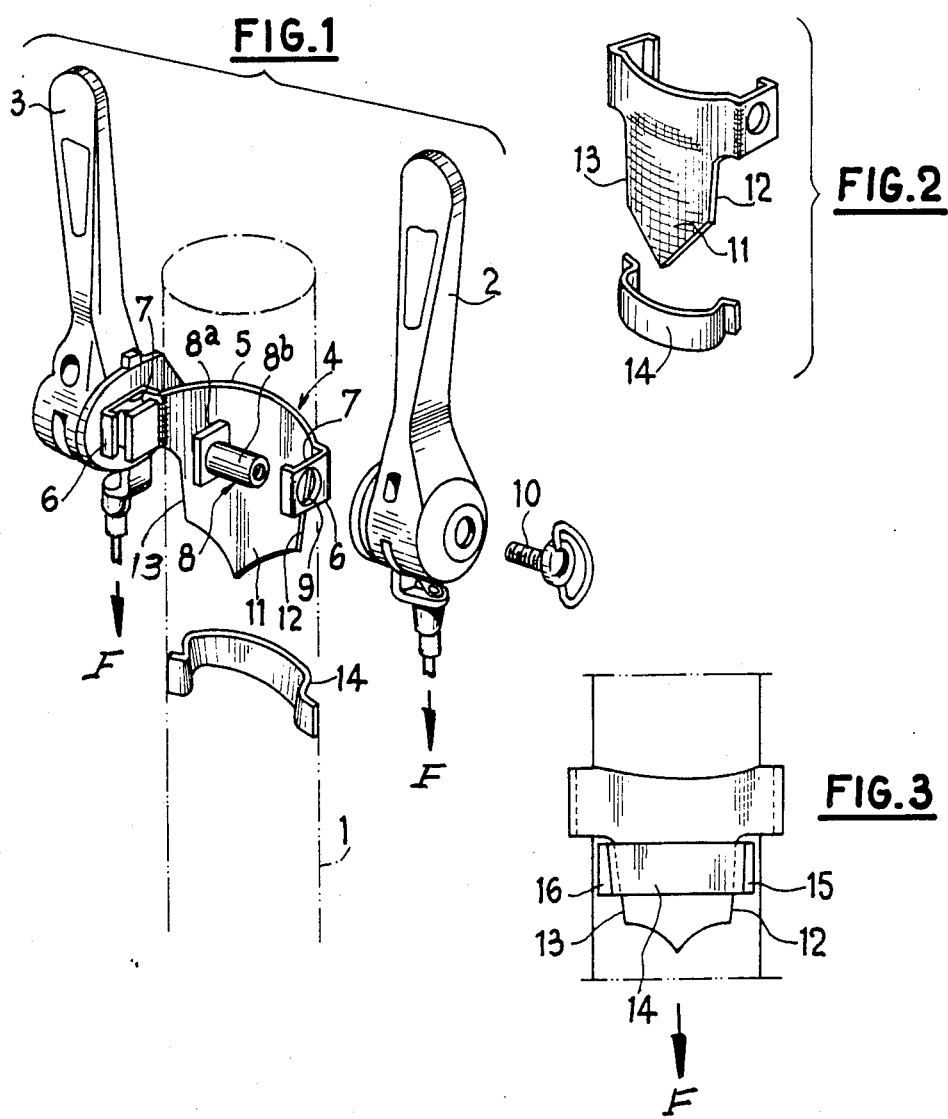

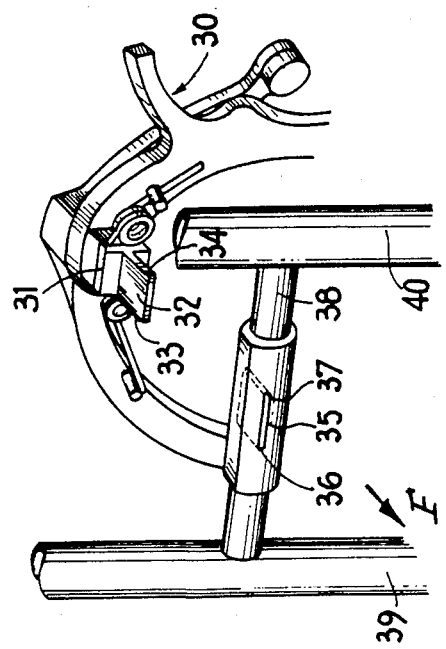
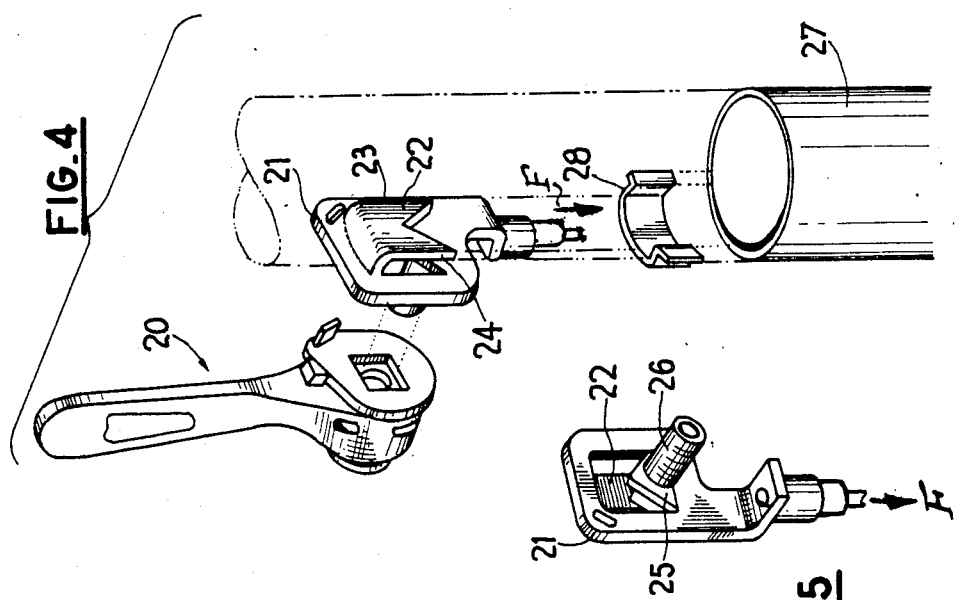

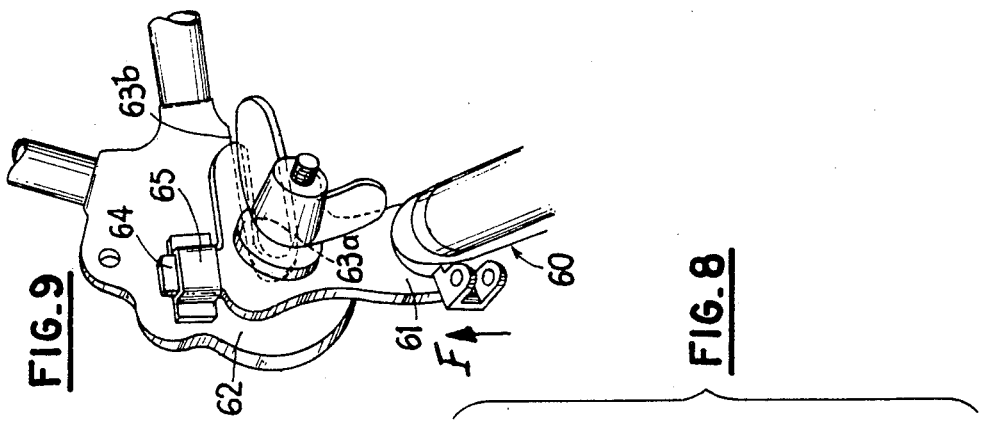
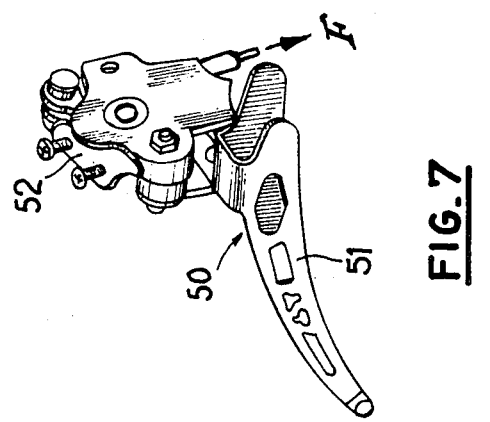

DEVICE FOR FIXING AN ACCESSORY ON A CYCLE

The present invention relates to the mounting and fixing of accessories of cycles, such as, for example, front and rear derailleurs, actuating levers of these derailleurs, brakes, etc. . . .

It is known that for fixing in particular levers controlling derailleurs, collars are employed. Some of these collars are obtained from a sheet metal blank which is so formed as to define the collar proper and two ribbed and perforated ears in which a bolt for clamping the collar is engaged. Other collars are made in two parts interconnected by a hinge, for example for mounting front derailleurs. In any case, this type of fixing presents important problems when mounting since the collar is not always easy to place in position and thereafter the collar must be clamped by a screw and a nut, which constitutes a relatively long operation. Further, if it is badly clamped, or after a certain period of utilization, there is a risk of the collar slipping so that it is usually necessary to provide on the frame of the cycle a brazed lug whose function is to act as an abutment and maintain the collar in the chosen position. These collars, whether the be in a single piece or pivotally assembled, moreover constitute expensive parts bearing in mind the amount of material necessary, the forming operations and the screw means employed for their clamping.

It has also been proposed to mount the control levers of derailleurs on lugs fixed by brazing on each side of the frame. These lugs define a base for the mounting of the lever and are provided with a tapped aperture in which the fixing screw is engaged. This manner of fixing is aesthetically more satisfactory, but also has certain specific drawbacks: thus it requires supplying to the constructing of cycles a lever mounted on a false lug of plastics material which must be dismantled when the lever is placed in position on the brazed lug, which involves a risk of an offsetting of the component parts of the lever or even the dropping and loss of one of these parts. This handling is indeed delicate and complicates the operation for mounting the lever on the lug. Further, each lug is adapted to a certain type of lever and difficulties of adaptation are encountered when levers of other types are desired to be mounted.

The document DE-A-936 795 discloses a motor vehicle whose fuel tank is fixed in a position straddling a tube of the frame. This fixing is achieved, on one hand, by means of a first tab carried by the tank and engaged in a yoke carried by the tube and, on the other hand, by means of a second tab connected to the tank and clamped on the tube by a collar. In this arrangement, the fixing is in fact achieved by the collar, the first tab and the yoke merely having the function of retaining the upper part of the tank. Such a fixing device is consequently complicated and does not afford a solution, in particular when the accessory performs an active function and is subjected to forces when using the cycle, which is not the case of a fuel tank.

Document CH-H-427 539 discloses, in one of its embodiments, the mounting of a prop on a cycle achieved by means of two complementary parts having a frustoconical or pyramidal shape respectively carried by the frame and the prop itself. However, the locking of the two parts is not positive so that this type of fixing is unsuitable in the case of an accessory subjected to forces in the course of utilization.

The problem that the invention proposes to solve is the following: provide a device for fixing accessories of cycles which is simpler than known devices and permits a simplification of the mounting operations by, in particular, allowing the accessory to be supplied ready for mounting.

The invention therefore provides a device for fixing an accessory on a cycle, said device comprising a support on which said accessory is mounted, the support and the part of the cycle on which it must be fixed comprising two respectively male and female complementary parts which are so arranged as to be rendered integral with each other by wedging, the arrangement being such that, when a force is exerted on the accessory in the course of utilization, this force tends to increase the wedging between the male part and the female part. According to other features:

the support has two lateral branches, each of which is adapted to receive a derailleur control lever;

the male part is in one piece with the support and this male part is constituted by a tab obtained by shearing and deforming said support.

The invention will be described in more detail hereinafter with reference to the accompanying drawings which are given merely by way of example and in which:

FIG. 1 is an exploded perspective view of a double control lever for derailleurs mounted in accordance with the invention;

FIG. 2 is a perspective view merely showing the lever support and the bridge member adapted to be fixed to the frame;

FIG. 3 is an elevational view showing the support is position on the frame;

FIG. 4 is a view similar to FIG. 1 of a modification representing the mounting of a single lever;

FIG. 5 is a perspective view of the support of FIG. 4 in another position;

FIG. 6 is a view of the mounting of a rear brake;

FIG. 7 is a perspective view of a front derailleur carried by a support according to the invention;

FIG. 8 is a perspective view of the support of FIG. 7 and the ridge member for fixing to the frame;

FIG. 9 shows an example of the mounting of a rear derailleur;

FIG. 1 shows a post 1 of a cycle frame in dot-dash lines and an assembly of two levers 2, 3 for controlling a rear derailleur and a front derailleur respectively.

Figure 10:
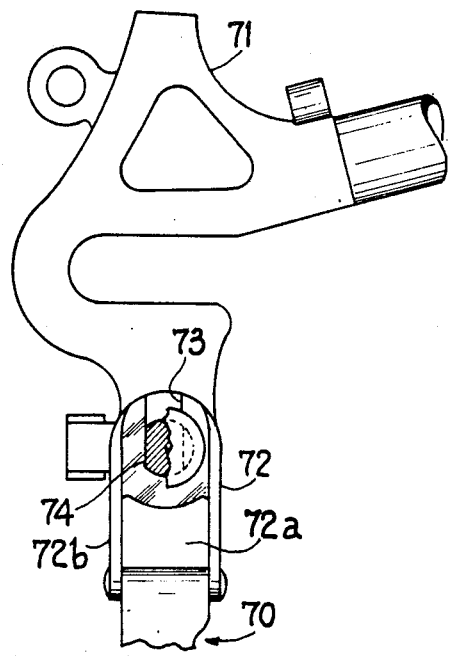
FIG. 10 shows another example of the mounting of a rear derailleur.

According to the invention, these two levers are carried by the support 4 having a central curved part 5 for matching the shape of a tube constituting the frame, extended by two lateral branches 6 which define, on one hand, a cavity 7, for example of square shape, for receiving the head 8a on a stud 8 for fixing the lever, and, on the other hand, an orifice 9 for the passage of of the stem 8b of this stud. Each lever is fixed to the corresponding stud by means of a screw 10.

The support of the two levers includes a downwardly extending tab 11 in one piece therewith which also matches the shape of the tube and has two sides 12, 13 which are slightly convergent at a few degrees, for example 5°, relative to the direction parallel to the axis of the tube 1.

This part is adapted to engage in a cavity of corresponding shape defined, on one hand, by the tube and, on the other hand, by a U- or Ω-shaped bridge member 14 brazed on this tube. The bridge member is preferably open in its lower part so as to allow the lower part of the tab 11 to extent therethrough and it includes two lateral walls 15, 16 which are also convergent at roughly the same angle as the angle of the sides 12, 13 of the tab, as can be seen in FIG. 3.

FIGS. 4 and 5 show the mounting of a single lever 20 for actuating a front or rear derailleur. This lever is carried by a support 21 in which is formed by a shearing and deforming operation a tab 22 which corresponds as concerns its operation to the tab 11 of FIGS. 1 to 3. Thus, this tab has a curvature corresponding to that of the tube on which it is fixed and includes two lateral sides 23, 24 which are slightly convergent, for example at the same angle of twice 5° as in the preceding embodiment. Further, this tab is so cut out as to leave on the support a central part 25 of sufficiently large area on which is brazed or fixed in any other way a stud 26 for mounting the lever. In the illustrated embodiment, the cut-out portion thus formed in the support has a generally M-shape.

Fixed on the tube 27 of the frame, as in the preceding embodiment, is a bridge member 28 adapted to define with the tube the cavity in which the tab 22 is engaged and wedged. The lateral walls of this bridge member converge at an angle roughly equal to that made between the edges of the tab 22.

It will be observed that in the case of the two embodiments described hereinbefore, the pull or force F. exerted by the cable in use, which may be of the order of 20 kg, urges the support in a direction which tends to increase the wedging and thus ensures a very good fixing of the tab on the frame.

FIG. 6 shows the mounting of a rear brake 30. This brake is fixed on a support 31 which has in its front part a fixing tab 32 of planar shape, whose two longitudinal edges 33, 34 are convergent as in the preceding embodiments. This tab is adapted to engage in a cavity 35 of corresponding shape, i.e. a cavity whose two longitudinal sides 36, 37 are also convergent and which is formed in a brace 38 which may be reinforced and extends between two stays 39, 40 of the frame. In this embodiment, the force F. to which the brake is subjected in use is transmitted to its support and has for effect to tend to urge the tab 32 further into its cavity and consequently to increase the wedging between these two elements. There is therefore no risk of the brake becoming disengaged.

A device for mounting a front or a chain-wheel derailleur 50 is shown in FIGS. 7 and 8. This derailleur comprises in the conventional manner a fork 51 connected to a support 52 by an articulation mechanism which will not be described in detail and may be of the type consisting of a deformable parallelogram structure. The support 52, which is shown more clearly in FIG. 8, has a curved shape with a profile corresponding to that of the tube 53 on which it is fixed. This support is downwardly extend by a tab 54 which is quite similar to that of the support shown in FIGS. 1 to 3. This tab therefore includes two sides 55, 56 which are slightly convergent. It is adapted to be received in a cavity defined, on one hand, by the tube 53 and, on the other hand, by a bridge member 57 brazed on this tube. For this purpose, the bridge member includes two sides which are slightly convergent, for example at an angle of 5° relative to the direction parallel to the axis of the tube. Here again, the pull or force F. exerted by the cable actuating the derailleur participates in the maintenance of the support relative to the frame, notwithstanding the absence of a collar.

The mounting of a rear derailleur 60 is shown in FIG. 9. This derailleur is carried by a support plate 61 fixed to a frame tab or lug 62. The support plate defines a slot 63a adapted to come roughly in coincidence with the slot 63b formed in the frame lug and in which the spindle of the rear wheel is fixed. Further, this support plate has a tab 64 which extends upwardly at roughly a right angle relative to the direction of the slot 63a. This tab is adapted to be received in a cavity defined by a frame lug and a bridge member 65 brazed to this frame lug or produced by a shearing and deforming operation. As before, this bridge member defines preferably a cavity of convergent shape and the tab has a corresponding shape so as to achieve a wedging effect between the support plate and the frame lug.

Figure 11:
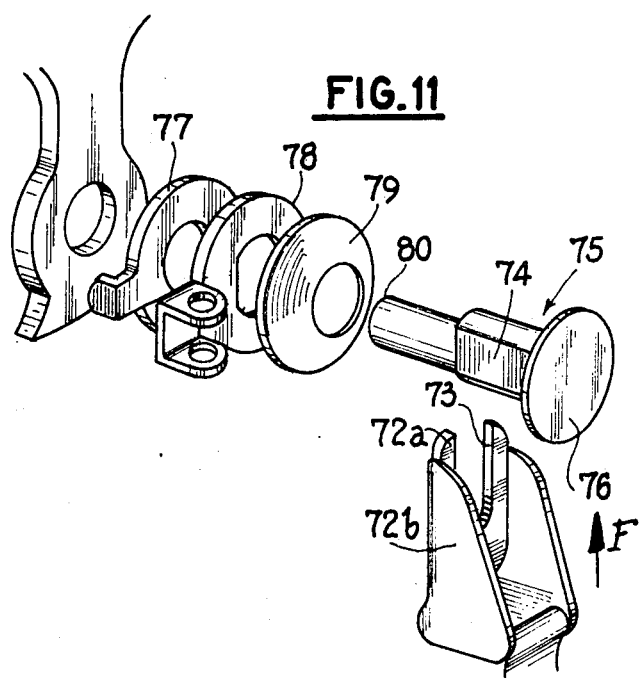
FIG. 11 is an exploded perspective view corresponding to the arrangement of FIG. 10.

FIGS. 10 and 11 show another embodiment of means the operating force F again holds the parts together for fixing a derailleur 70 to a frame lug 71. This derailleur includes an upper element 72 constituting one of the sides of a parallelogram structure, or of an articulated quadrilateral structure, on which are pivotally mounted the two longitudinal sides of this parallelogram or quadrilateral. The element 72 includes a bottom 72a and two lateral walls 72b. The two longitudinal sides of the parallelogram structure are pivotally mounted in these two lateral walls. The bottom 72a has an upwardly open notch 73 which is adapted to engage on the two flat surfaces 74 of the rod of a fixing means 75. Disposed between the head 76 of this fixing means and the lug are a first abutment washer 77, a second washer 78 defining an abutment for the sheath of the actuating cable, and a resiliently yieldable washer 79. After mounting, the fixing means is preferably riveted to the frame lug, the end 80 of the rod of this fixing means being then enlarged so as to constitute the head of the rivet. It will be understood that a wedging action can be obtained between the edges of the notch 73 and the flat surfaces 74 of the fixing means 75.

The derailleur is then mounted by simply engaging it on the fixing means 75, this mounting being achieved by sufficiently compressing the resiliently yieldable washer 79 so that the derailleur is correctly fixed in position.

In the arrangements shown in FIGS. 9, 10 and 11, the reaction force F. exerted by the system putting the chain under tension, located in the lower part of the derailleur, is in the upward direction and tends to engage the tab 64 in the cavity 65 and the element 72 on the fixing means 75 so that there is no risk of an accidental disassembly.

In all the embodiments described hereinbefore and illustrated, the mounting device according to the invention affords considerable advantages over conventional devices. Thus, the following advantages are obtained in all cases:

the accessories in question may be delivered to the cycle constructor fully assembled and this constructor has merely to engage them in the bridge members or other cavities provided on the frame of the cycle; this simple mounting operation is extremely advantageous relative to that which requires unscrewing and screwing, not only as concerns the saving in time when mounting, but also the safety and reliability of this mounting, since there is no risk of loss of component parts; tne brazing of the bridge members or other like members is carried out at the same time as the other brazing operations already required on the frame and therefore does not constitute an additional operation;

in any case, the accessory maintained in position by a wedging action is in operation subjected to a force which tends to increase this wedging so that the mounting achieved is very reliable and firm;

however, dismantling remains simpler than in the case of prior devices since, here again, no unscrewing is necessary;

the fixing means are simplified relative to known devices, the number of component parts is reduced and the appearance of the assembly is consequently improved, leaving bare portions of the frame which are usually covered by collars, since, in particular in the case of levers and of the front derailleur, the support and its fixing tab only cover a part of the periphery of the tube and thus leave the frame bare on the major part of its periphery.

It will be understood that other modifications may be envisaged. For example, a front brake may also be filed in position by means of a vertical tab received in a cavity carried by the front fork, if this fork includes a part of sufficient height to permit this tab to be placed in position and disengaged.

According to another feature of the invention, the wedging means between the male part and female part may include steps and/or clipping means for improving the performance of the assembly.

, What is claimed is:

1. A deviee for mounting an accessory on a part of a cycle, said accessory being subjected to a force exerted by another component part of said cycle in operation, said device comprising a support on which said accessory is movably mounted, one of said support and said part of the cycle comprising a male part and another of said support and said part of the cycle comprising a female part, said male part and said female part being so shaped and adapted to be interengaged for said mounting with a wedging action therebetween in a given direction relative to said cycle for said interengagement, and means for maintaining said support in position such that said male and female parts are maintained interengaged, said means comprising an arrangement in which said force to which said accessory is subjected in operation is exerted substantially in said given direction.

2. A device according to claim 1, wherein the male part is in one piece with said support and is constituted by a tab resulting from a shearing and deforming operation carried out on said support.

3. A device according to claim 2, wherein said accessory is a lever for controlling a derailleur and said support includes a plate in which said tab is formed by a shearing and deforming operation carried out on the plate, said tab being cut out in such manner as to leave on the plate a central portion carrying a stud for mounting said lever.

4. A device according to claim 1, wherein the accessoary is a rear caliper brake, said support including a tab which defines said male part and extends forwardly of the cycle, in the position of the device on the cycle, in said given direction which is substantially perpendicular to the general plane of the caliper brake, a brace between two stays of the frame of the cycle comprising means defining said female part in the form of a cavity in which said tab is received.

5. A device according to claim 1, wherein the accessory is a shifting fork of a front or chain-wheel derailleur, said given direction is downward relative to said cycle in a normal upright position of the cycle, and said means for maintaining said support in position comprising the force of gravity in combination with a force exerted by a cable connected to said fork for shifting said fork.

6. A device according to claim 1, wherein the accessory is a rear derailleur and said support comprises a plate defining a tab which defines said male part and is received in a cavity defined by means carried by a lug of a frame of the cycle and constituting said female part and said means maintaining said support in position comprise a force exerted by a system forming part of said derailleur adapted to tension a chain.

7. A device according to claim 6, wherein said support defines a slot adapted to receive a spindle of a rear wheel of the cycle.

8. A device according to claim 1, wherein the accessory is a rear derailleur and said support defines a notch which constitutes said female part and cooperates with a fixing member constituting said male part and with a resiliently yieldable element which acts axially of said fixing member, said means maintaining said support in position comprises a force exerted by a system putting the chain of the cycle under tension and a force exerted by said resiliently yieldable element.

9. A device for fixing an accessory to a part of a cycle, said device comprising a support on which said accessory is mounted, one of said support and said part of the cycle comprising a male part and another of said support and said part of the cycle comprising a female part, said male part and said female part being adapted to be interengaged with a wedging action, said device being so combined with and arranged on said cycle that, when a force is exerted on the accessory in the course of use of the accessory, said force tends to increase said wedging action between the male part and the female part, said support having two lateral branches each of which branches receives a lever constituting said accessory for controlling a derailleur.

10. A device for mounting a manually shifted lever on a part of a cycle, said device comprising a support on which said lever is mounted to be pivotable about a pivot axis, one of said support and said part of the cycle comprising a male part and another of said support and said part of the cycle comprising a female part, said male part and said female part being so shaped and adapted to be interengaged for said mounting with a wedging action therebetween and in such a direction that said support is moved downwardly relative to said cycle for said interengagement in a normal upright position of said cycle, said lever extending upwardly of said pivot axis in the mounted position of said support so that, when a force is exerted on said lever in the course of said manual shifting of said lever, the effect of said force, in combination with the force of gravity, and a force exerted by a cable connected to for actuation by said lever, biases said support downwardly and tends to increase said wedging action.

* * * * *